(12) United States Patent
Eichstedt et al.

(10) Patent No.: US 6,196,498 B1
(45) Date of Patent: Mar. 6, 2001

(54) SEMI-BUOYANT VEHICLE WITH AERODYNAMIC LIFT CAPABILITY

(75) Inventors: David B. Eichstedt, Lancaster; John P. Morehead, Santa Clarita; John B. Kalisz, Newhall, all of CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/467,971

(22) Filed: Dec. 21, 1999

(51) Int. Cl.$^7$ ....................................................... B64B 1/20
(52) U.S. Cl. .................................................. 244/5; 244/25
(58) Field of Search .................................. 244/5, 24, 25, 244/30, 31

(56) References Cited

U.S. PATENT DOCUMENTS

| | | | |
|---|---|---|---|
| 1,424,491 | * 8/1922 | Langevin | 244/5 |
| 2,379,355 | * 6/1945 | Hodgdon | 244/5 |
| 3,486,719 | * 12/1969 | Fitzpatrick et al. | 244/25 |
| 3,970,270 | * 7/1976 | Pittet, Jr. | 244/5 |
| 4,052,025 | * 10/1977 | Clark et al. | 244/25 |
| 5,005,783 | * 4/1991 | Taylor | 244/5 |

FOREIGN PATENT DOCUMENTS

9101917 * 2/1991 (WO) .

* cited by examiner

*Primary Examiner*—J. Woodrow Eldred
(74) *Attorney, Agent, or Firm*—Robert A. Schruhl

(57) ABSTRACT

The invention is a non-ridged, semi-buoyant vehicle. In detail, the invention includes a pressure stabilized gasbag having front and rear ends and an aerodynamic shape capable of producing lift, and longitudinal, vertical and horizontal axis, the tail end of the gasbag extending outward along the horizontal axis from each side of the longitudinal axis toward said front end at an acute angle to the horizontal axis. A horizontal tail surface is mounted outboard of the rear end of the gasbag, having a trailing edge extending outward along the horizontal axis from each side of the longitudinal axis toward the front end at the acute angle to the horizontal axis. A horizontal ridged beam is mounted outboard of the rear end of the gasbag that extends outward along the horizontal axis from each side of the longitudinal axis toward the front end at the acute angle to the horizontal axis with the horizontal tail surface mounted to the beam. The preferred acute angle is approximately 20 degrees. The gasbag further includes a plurality of vertical catenary curtains attached between the top and bottom surfaces of the gasbag. A vertical extending flexible bean is attached to each of catenary curtains. These straps have top and bottom ends extending out of the top and bottom surfaces, respectively, of said gasbag. Top and bottom attachment fittings are mounted by a first end to the top and bottom ends, respectively, of the ridged beam and by their second ends to the top and bottom ends, respectively, of the flexible straps.

2 Claims, 14 Drawing Sheets

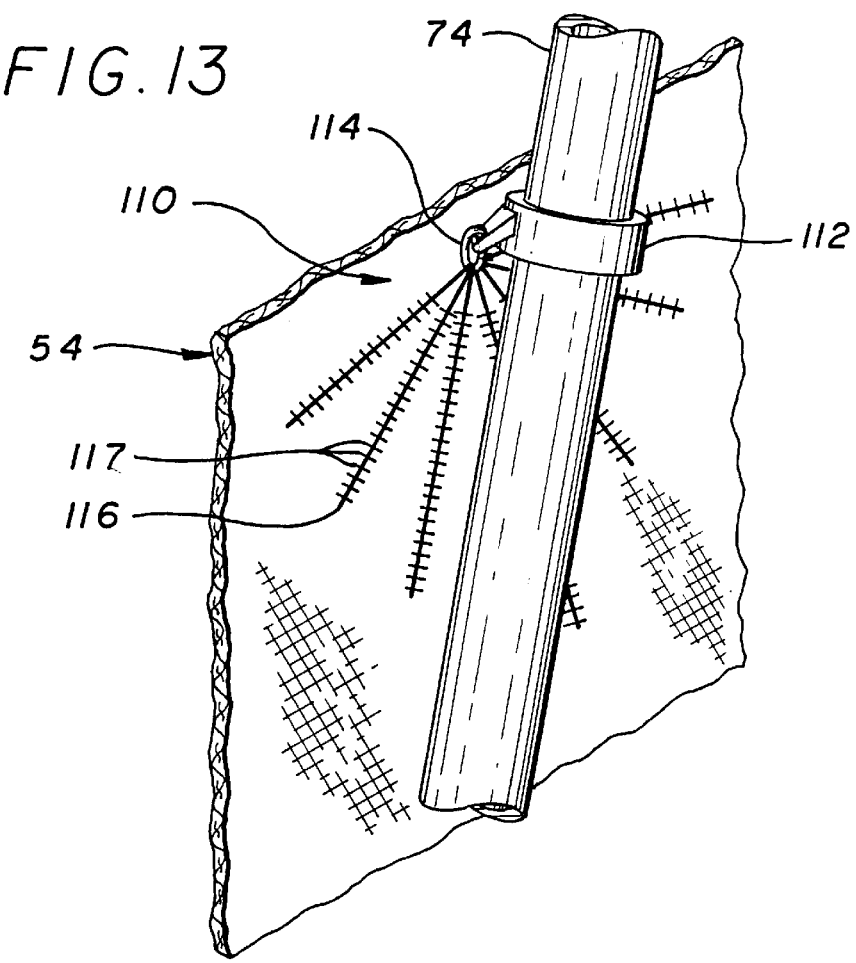
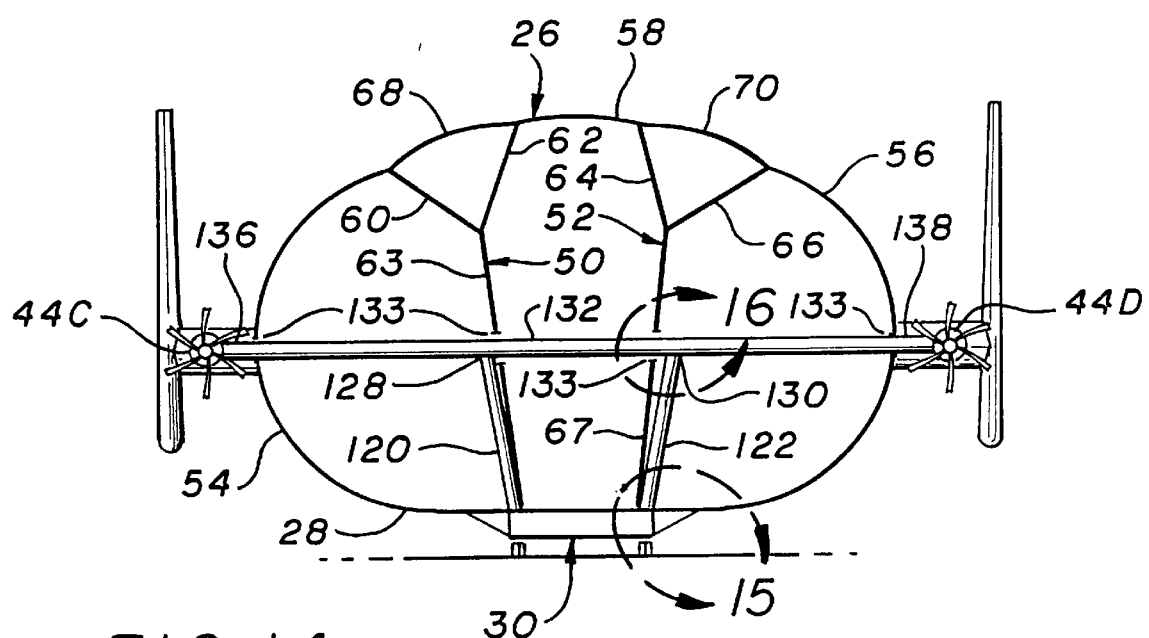

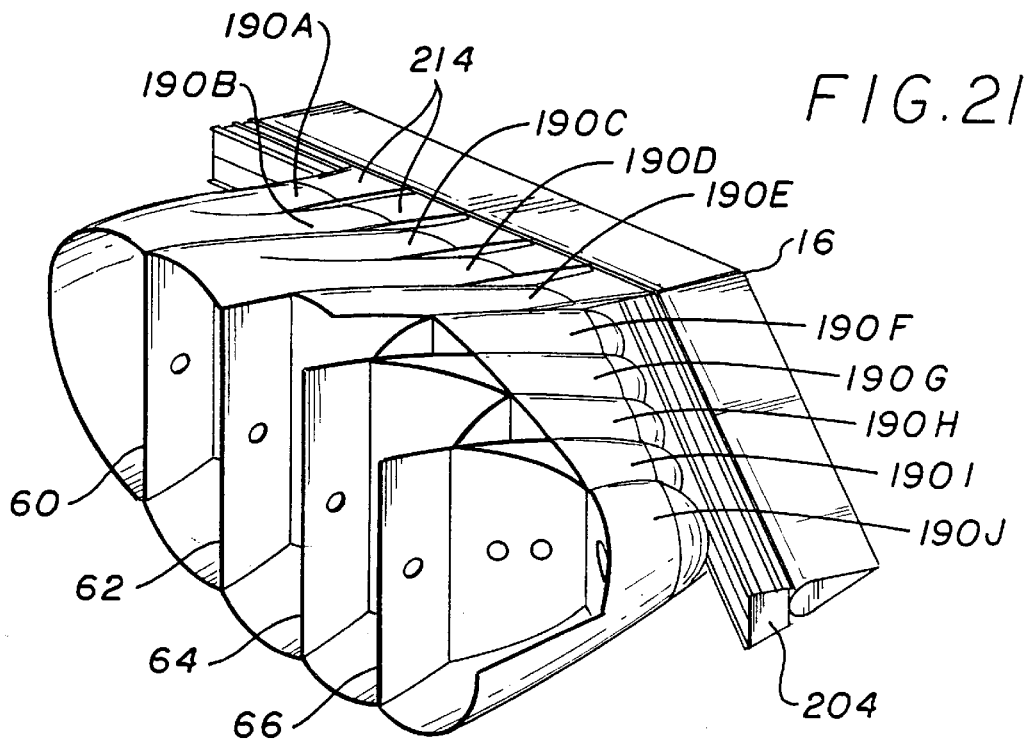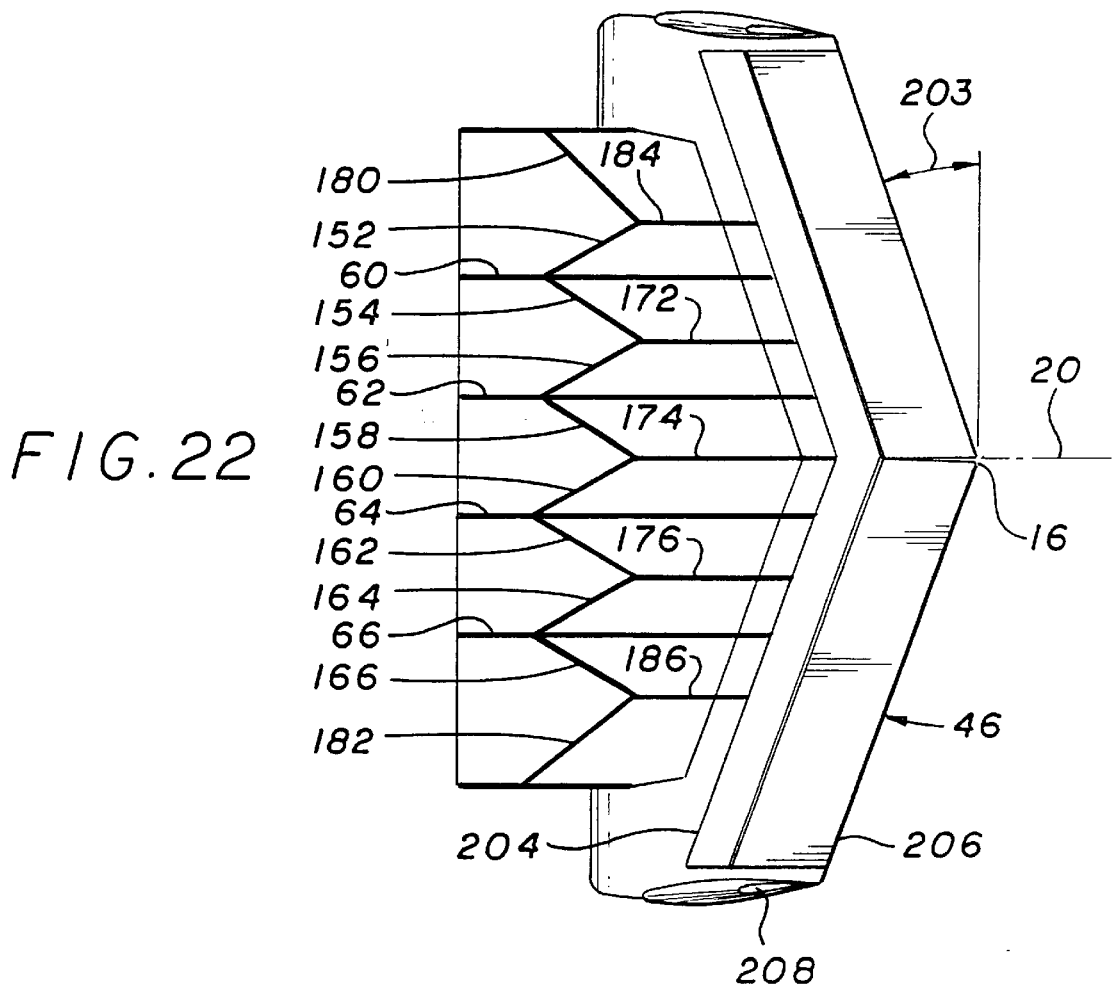

SEMI-BUOYANT VEHICLE WITH AERODYNAMIC LIFT CAPABILITY

BACKGROUND OF THE INVENTION

1. Field of the Invention

The invention relates to the field of airships and, in particular, to a non-ridged aerodynamic lift producing vehicle with improved lifting gas distribution such that center of buoyancy is more closely aligned with the center of gravity of the vehicle.

2. Description of Related Art

There are basically two main types of fully lighter-than-air vehicles; the ridged type or as it is more commonly called the "dirigible" and the non-ridged type or "blimp". Blimps basically comprise a single or multi-number of non-ridged gasbags wherein internal inflation pressure is used to form the external shape of the vehicle. A typical example of this design is found in U.S. Pat. No. 4,265,418 "Elongated Inflatable Structures For Flying Device Bodies" by M. Eymard the shape of the vehicle. The other basic type of lighter-than-air vehicle is the ridged design wherein an internal support structure is covered with a flexible material that serves as the outer skin. The vehicle may consist of a single gas chamber wherein the outer skin serves as the "gas bag" or can have numerous internal gasbags. An example of this concept can be found in U.S. Pat. No. 4,591,112 "Vectored Thrust Airship" by F. N. Piasecki, et al. However, both examples require that they be simultaneously loaded and unloaded in order to prevent the vehicle from "flying off." In fact, such vehicles must be tethered when on the ground during such operations. A particular limitation of the non-ridged design is that the cargo compartment and propulsion system must be mounted on gondola at the bottom of the vehicle. The gondola is typically supported by catenary cables or curtains attached to the top of the gasbag. The dirigible design allows most if not all these components to be mounted within the main body of the vehicle; although most all incorporates a gondola of some sort. However, when the vehicle is extremely large there costs become prohibitive because the complexity of the internal structure. A problem with both designs is that, as fuel is consumed, the vehicle becomes lighter.

These two examples are true lighter-than-air vehicles in that the gas filled balloon generates all the lift. However, having the external contour of the vehicle in an aerodynamic lift producing shape can reduce the overall size of such vehicles and generally cost, for any given payload. Such aircraft are not totally buoyant and take off in a manner similar to a conventional aircraft. In such designs, it is common practice to use a ridged internal frame (the dirigible concept) in order to maintain the proper contour. For example U.S. Pat. No. 3,486,719 "Airship" by J. R., Fitzpatick, Jr. While the Fitzpatick, Jr. design uses a ridged skin, most use a flexible gasbag with an internal frame structure.

Of course there are non-ridged designs such as disclosed in U.S. Pat. No. 2,778,585 "Dynamic Lift Airship" by D. B. Tschudy. D. B. Tschudy's design includes a multi-lobe gasbag with a general aerodynamic shape, formed by catenary cables extending between the upper and lower surfaces of the vehicle.

However, there are problems with such vehicles, especially when they are very large. The generation of dynamic lift from the gasbag the vehicle creates bending in the gasbag, which are much greater than found in conventional fully buoyant vehicles. Secondly, the lift-generating body is much more aerodynamically unstable and therefore requires much larger tail surfaces than conventional vehicles, which in turn creates even greater loads on the air bag. These two factors would tend to point toward the use of a ridged internal structure. However, it has been found designing a ridged internal structure that's light enough and simple enough to produce at a reasonable cost does not appear to be feasible at the present time. Thus a pressure-stabilized structure appears to provide the only viable solution.

Prior art approaches such as disclosed by D. B. Tschudy addresses the above issue in that a metal support structure at the rear of the airship gas bag is used to absorb and distribute loads induced by the elevators into the gas bag. However, it is a complicated assembly. The three main lobes terminate in the same plane and the support structure includes 3 connected cup shaped caps that attach to the ends of the three lobes. While such an approach provides some benefit, it would have insufficient effect in very large vehicle. In addition, it does address the issue of the need to align the center of buoyancy with the center of gravity.

Thus, it is a primary object of the invention to provide a non-ridged partially buoyant vehicle having a low drag shape.

It is another primary object of the invention to provide a non-ridged partially buoyant vehicle that allows the vehicle mass and buoyancy centers to align while providing additionally providing increased support for large tail surfaces.

It is another primary object of the invention to provide a non-ridged partially buoyant vehicle that has an improved tail assembly load distribution system.

SUMMARY OF THE INVENTION

The invention is a non-ridged, semi-buoyant. In detail, the invention includes a pressure-stabilized gasbag having front and rear ends and an aerodynamic shape capable of producing lift. The tail end of the gasbag extends outward along the horizontal axis from each side of the longitudinal axis toward the front end at an acute angle to the horizontal axis. Preferably the acute angle is approximately 20 degrees. A horizontal and vertical tail assembly is mounted outboard of the rear end of the gasbag. The horizontal tail includes a trailing edge extending outward along the horizontal axis from each side of the longitudinal axis toward the front end at the acute angle to the horizontal axis. A horizontal ridged beam is mounted outboard of the rear end of the gasbag and which extends outward along the horizontal axis from each side of the longitudinal axis toward the front end at the same acute angle to the horizontal axis. The horizontal and vertical tail assembly is mounted to the ridged beam.

The gasbag further includes a plurality of vertical catenary curtains attached between the top and bottom surfaces of the gasbag. A vertical extending flexible strap is attached to each of catenary curtains. These straps have top and bottom ends extending out of the top and bottom surfaces, respectively, of said gasbag. Top and bottom attachment fittings are mounted by a first end to the top and bottom of the ridged beam and by their second ends to the top and bottom ends, respectively, of the flexible straps.

The advantages of this design are numerous. Excellent load transfer from the tail assembly into the gasbag is provided. In addition, the forward sweep pulls the center of buoyancy aft so that is better aligns with the center of gravity of the vehicle.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 13 is an enlarged perspective view of the attachment fitting connecting the forward propulsion system mounting tube to the catenary curtain.

FIG. 14 is a cross-sectional view of FIG. 4 taken along the line 14—14.

FIG. 21 is a partial perspective view of the aft portion of the vehicle shown in FIG. 4 taken along the line 21—21.

FIG. 22 is a cross-sectional view of the aft portion of the vehicle shown in FIG. 3 taken along the line 22—22.

DESCRIPTION OF THE PREFERRED EMBODIMENT

Figure 1:
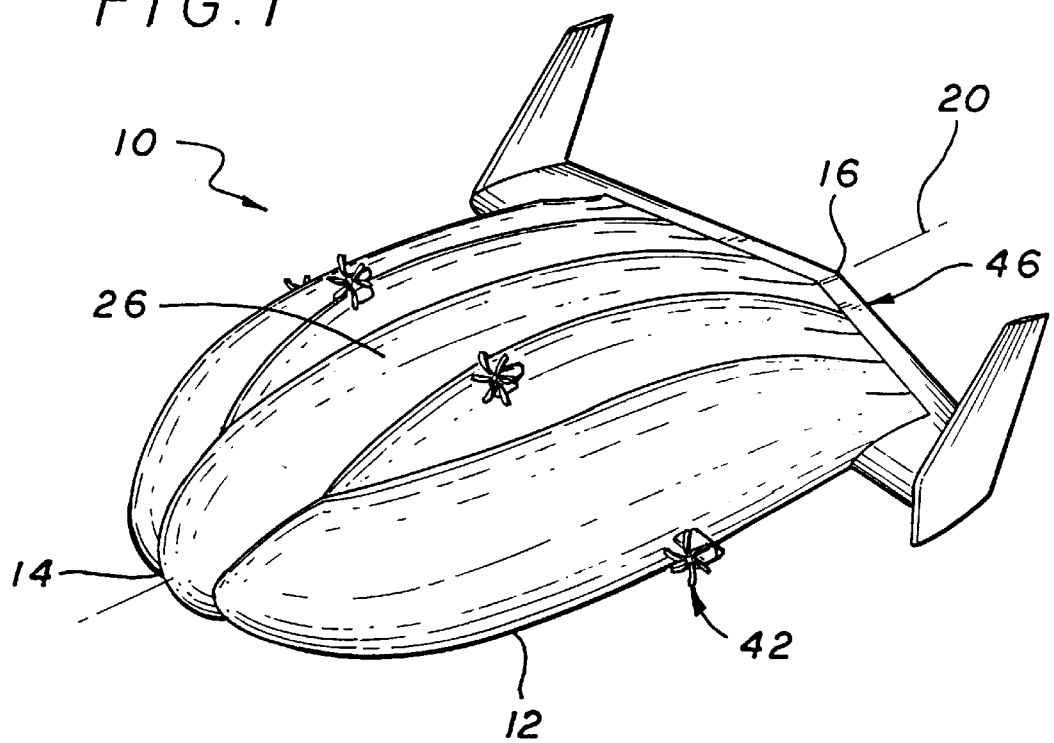
FIG. 1 is a perspective view of the aircraft.
Figure 2:
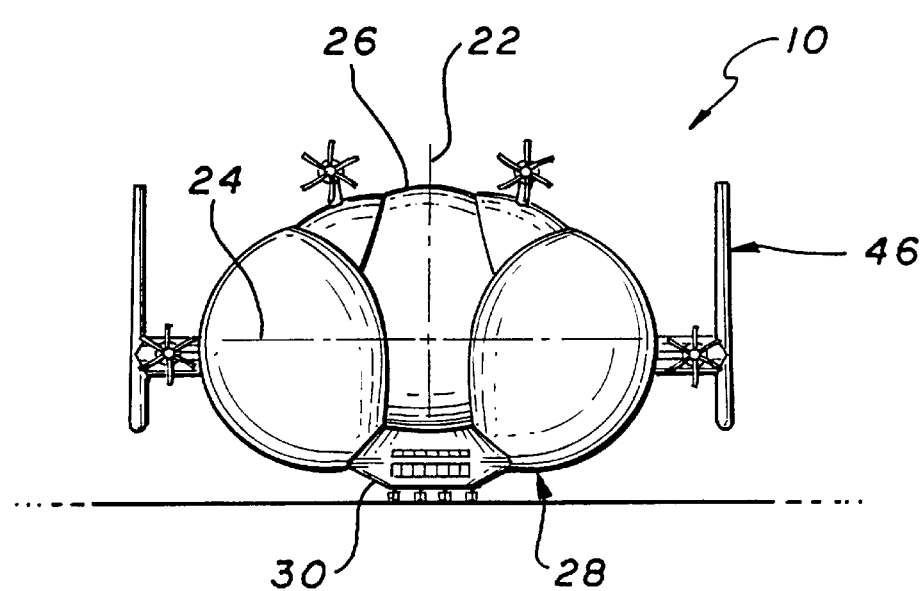
FIG. 2 is a front view of the aircraft.
Figure 3:
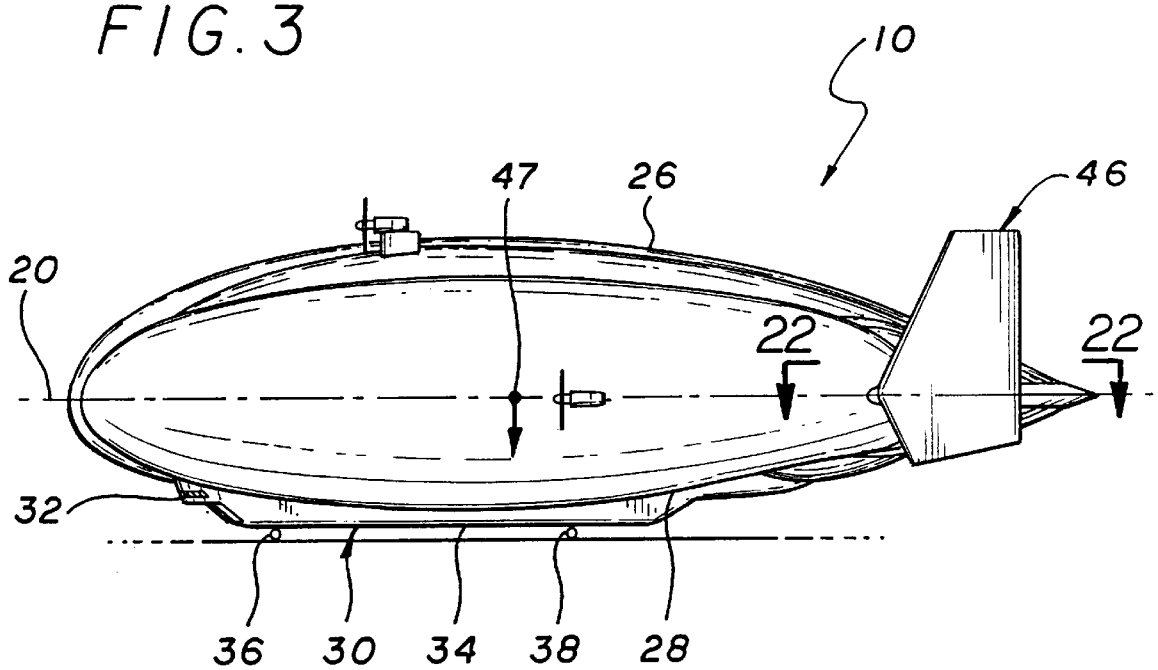
FIG. 3 is a side view of the aircraft.
Figure 5:
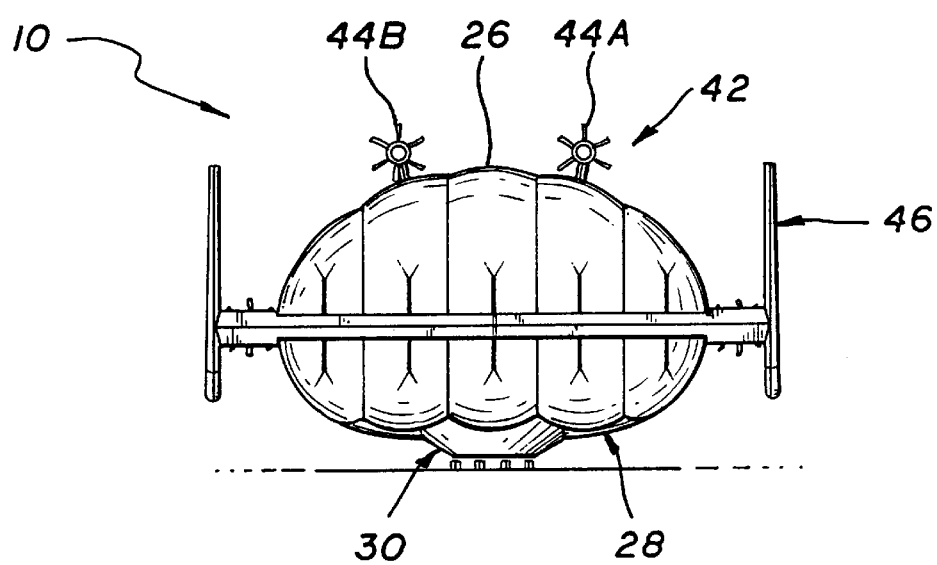
FIG. 5 is a rear view of the aircraft.
Figure 4:
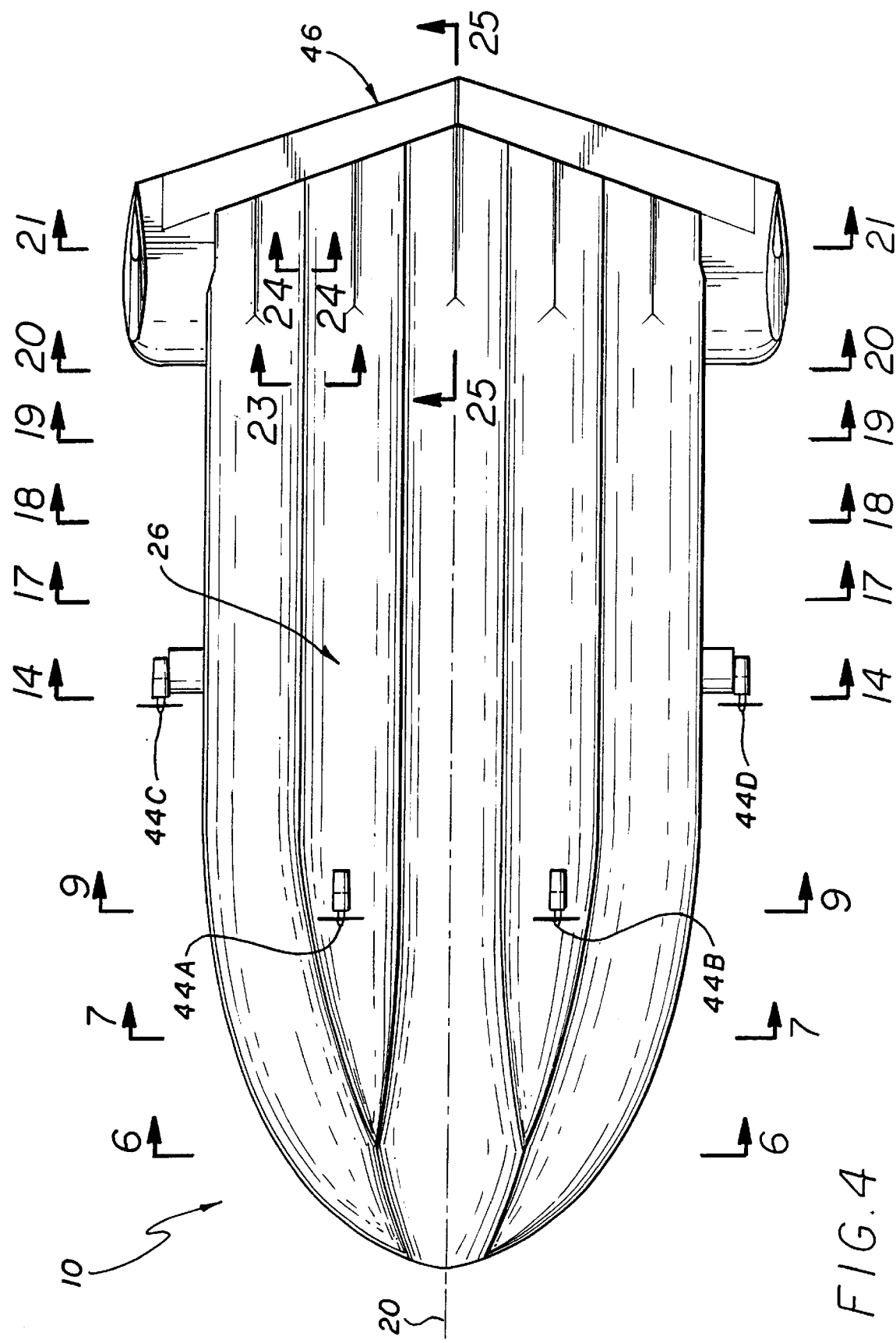
FIG. 4 is a top view of the aircraft.

Referring to FIGS. 1–5, the vehicle, generally indicated by numeral 10, includes a pressure stabilized gasbag 12 having a front end 14 and rear end 16, longitudinal axis 20, vertical axis 22, and horizontal axis 24. Thus gases such a Helium or Hydrogen, preferably the former, are used for pressurization.

The gasbag 12 further has an aerodynamic shape capable of producing lift. A suitable bag material is disclosed in U.S. patent application Ser. No. 08/799,635 "Flexible Material for Use In An Inflatable Structure" filed Feb. 12, 1997 to Sidwell (common assignee). Attached to the lower surface 28 is a gondola 30, in a manner to be subsequently discussed. The gondola 30 includes a flight station 32, cargo compartments 34 and nose and main landing gears, indicated by numerals 36 and 38, respectively. The vehicle 10 also includes a propulsion system 42 containing four propulsion units 44A, 44B, 44C and 44D, and as illustrated the propellers are driven by turbo-shaft engines. Attached to the rear end 16 is a horizontal and vertical tail assembly 46, also in a manner to be subsequently discussed. The center of gravity, indicated by numeral 47, is slightly in front of the main landing gear 38. Therefor, it can be seen that the vehicle 10 is a non-ridged, semi-buoyant type vehicle and, therefore, takes off and lands like an aircraft, however at a very low speed.

Figure 6:
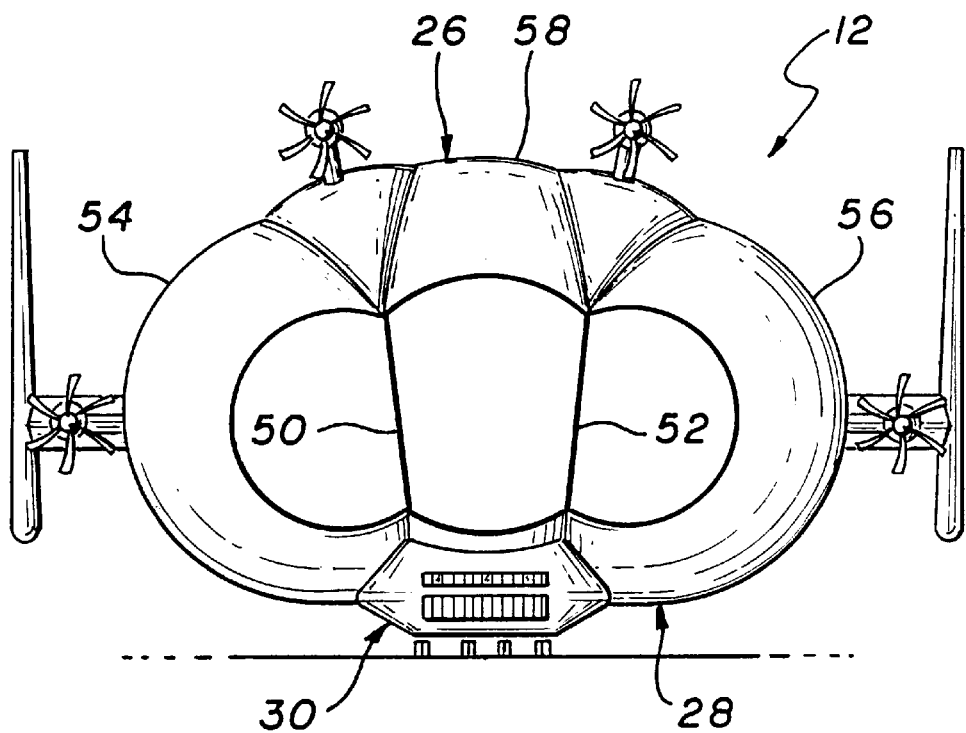
FIG. 6 is a cross-sectional view of FIG. 4 taken along the line 6—6.
Figure 7:
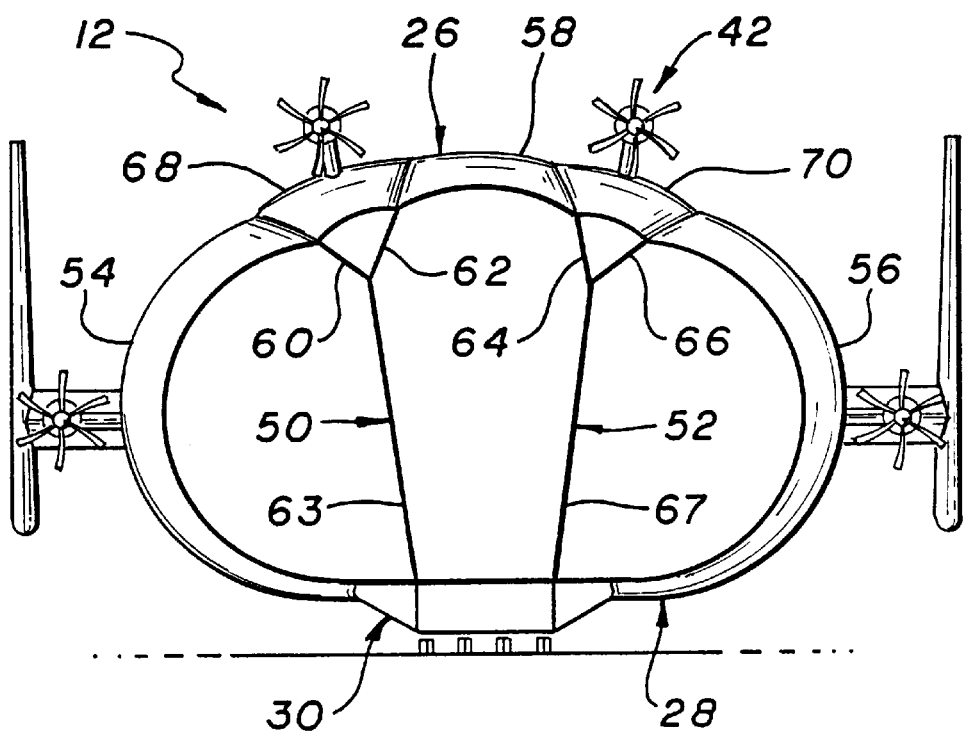
FIG. 7 is a cross-sectional view of FIG. 4 taken along the line 7—7.
Figure 8:
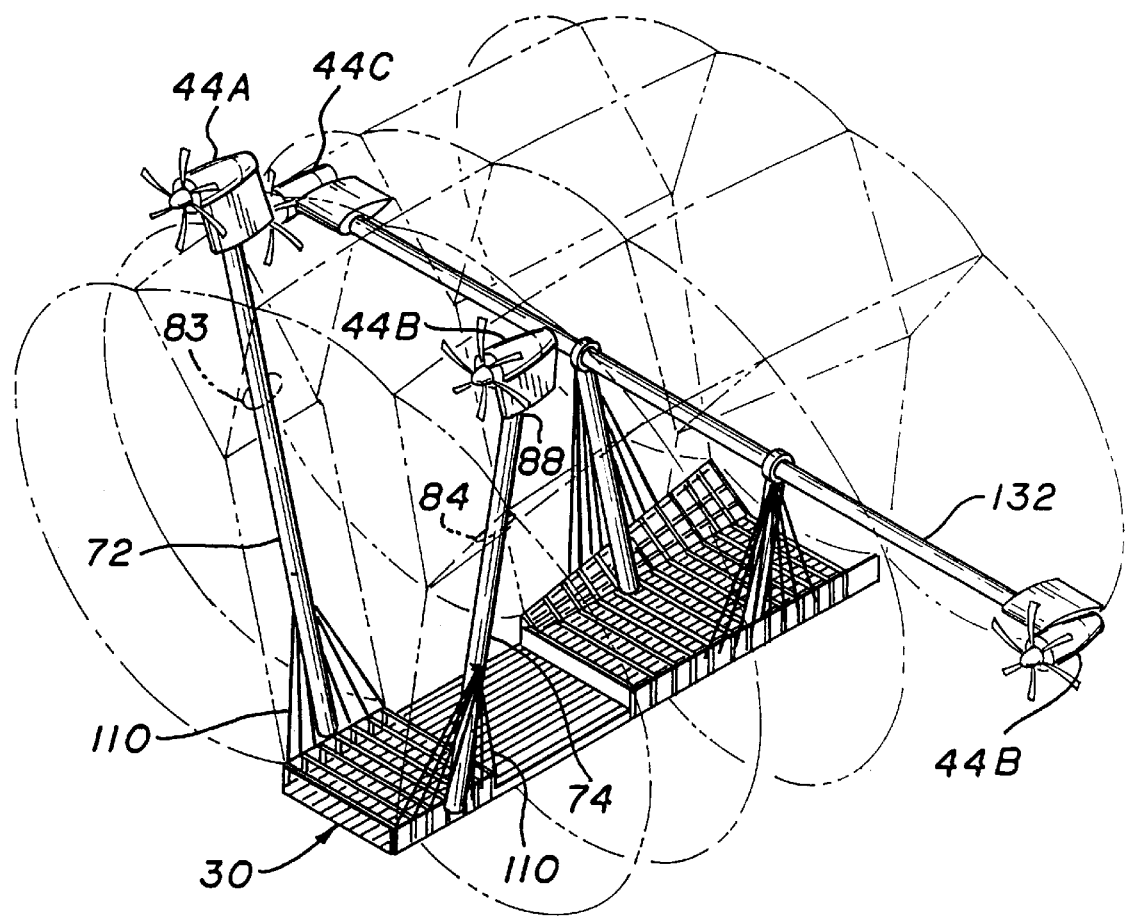
FIG. 8 is a partial perspective interior view of FIG. 1 illustrating the front portion of the propulsion system.
Figure 9:
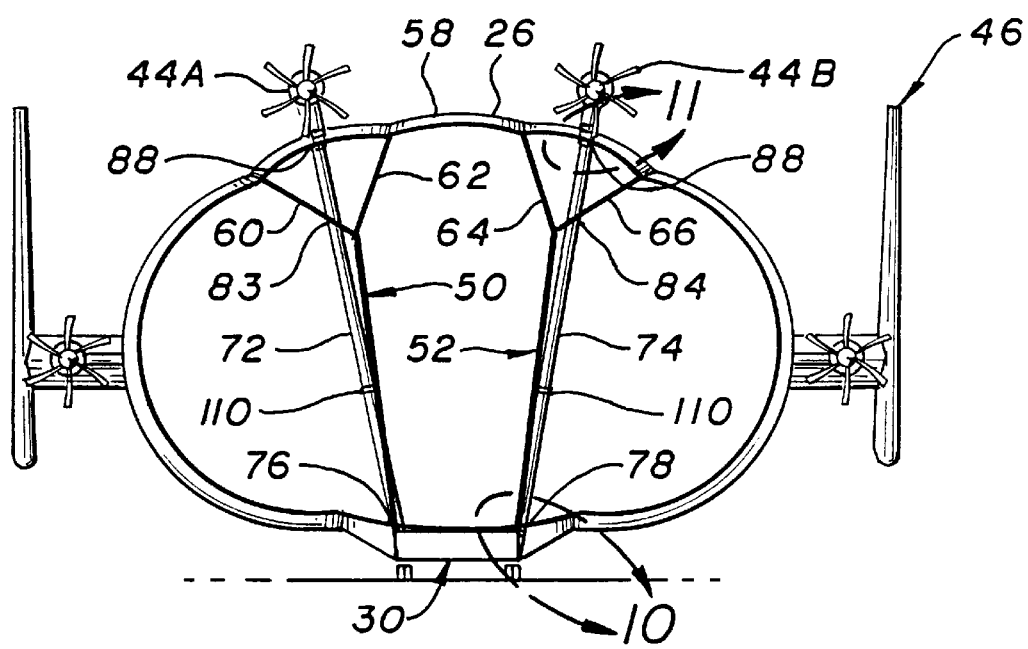
FIG. 9 is a cross-sectional view of FIG. 4 taken along the line 9—9.
Figure 10:
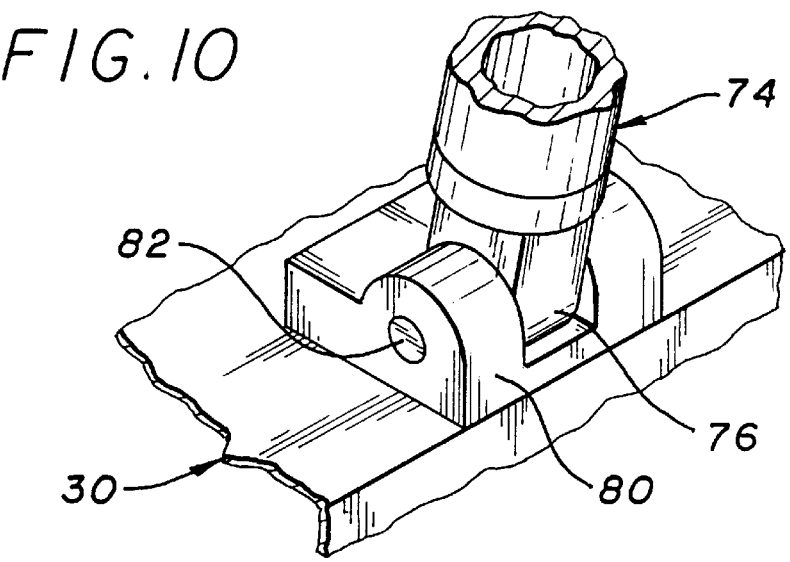
FIG. 10 is an enlarged portion of FIG. 1 illustrated the mounting of the tubular members of the front portion of the propulsion system to the gondola of the vehicle.

Still referring to FIG. 1 and additionally to FIG. 6, the gasbag 12 near the front 14 includes a pair of primary catenary curtains 50 and 52 (some times referred to "septums") which are attached to top and bottom surfaces 26 and 28. At the bottom surface 28 when over the gondola 30 they attach thereto and provide its primary support. The catenary curtains 50 and 52 thus form side lobes 54 and 56 and a center lobe 58. As seen in FIG. 7, the catenary curtain 50 changes into a Y shape with the arms 60 and 62 and leg 63 and curtain 52 changes into a Y shape with arms 64 and 66, and leg 67, forming additional lobes 68 and 70 in the top surface 26 of the gasbag 12. This transition begins at a point approximately between 20 to 22 percent of the length of the gasbag 12 measured from the front end 14.

Figure 11:
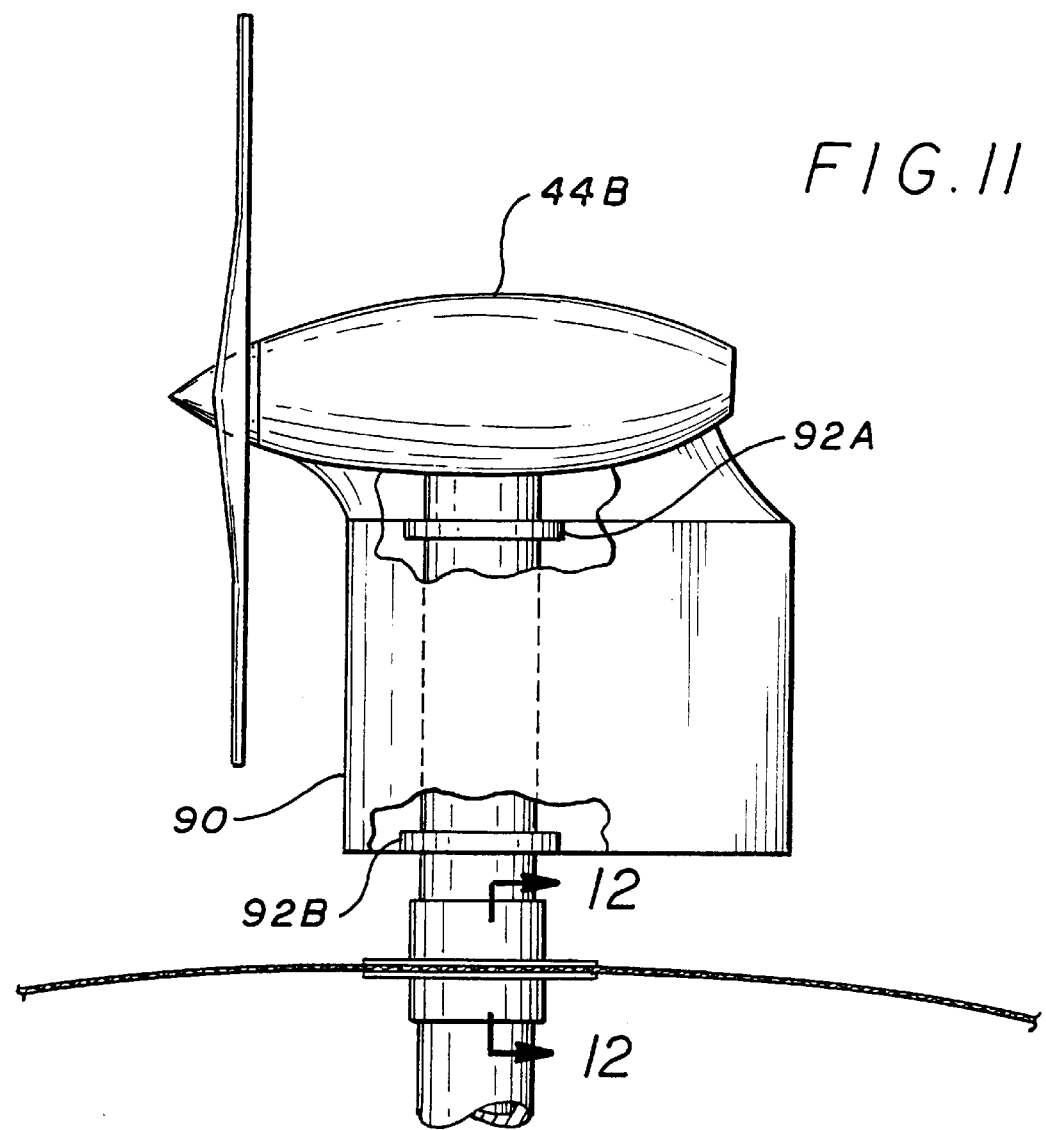
FIG. 11 is an enlarged view of a portion of the propulsion system shown in FIG. 8 illustrating the mounting of the propulsion units to the tubular members.
Figure 12:
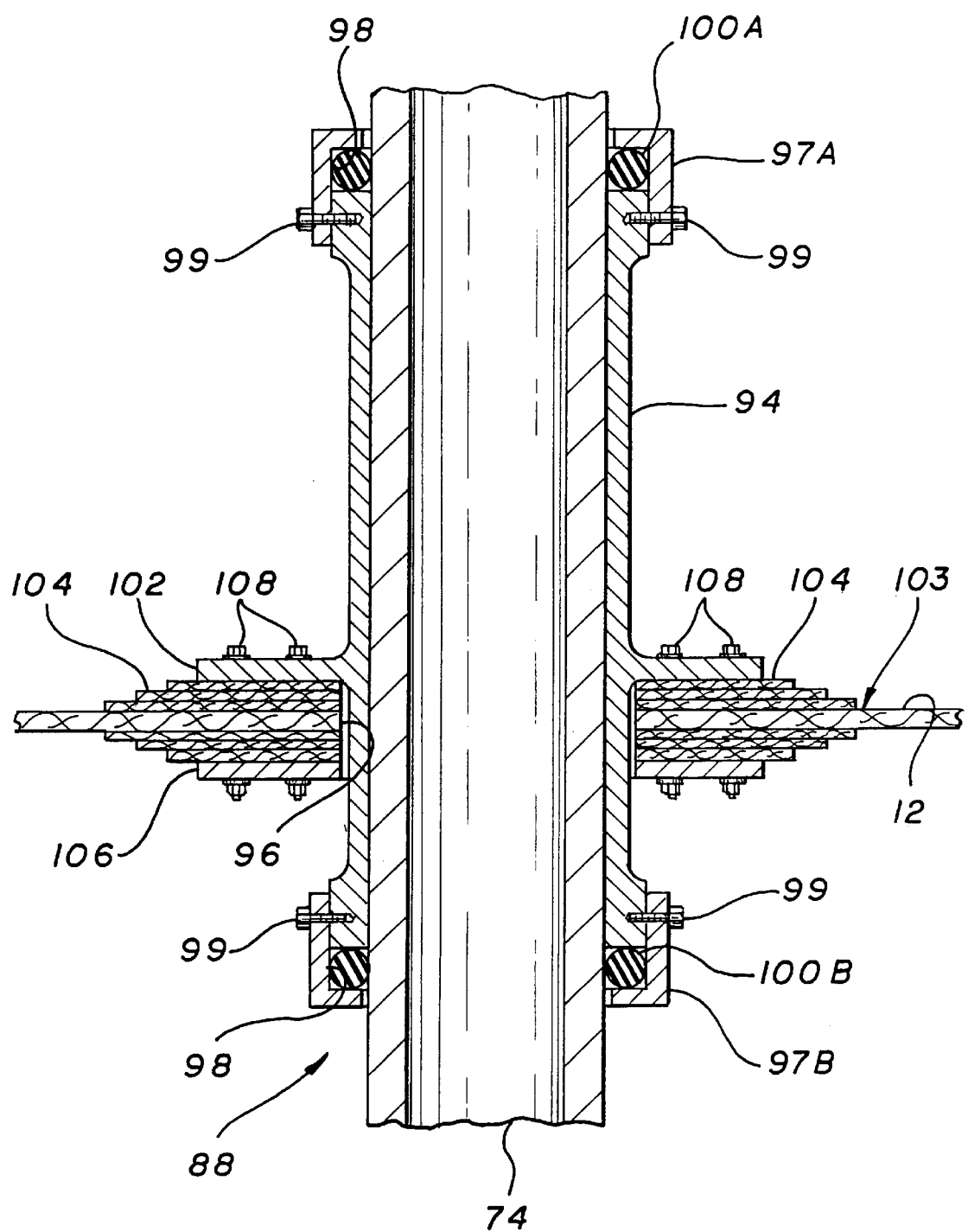
FIG. 12 is a cross-sectional view of FIG. 11 taken along the line 12—12 illustrating the propulsion system tubular member to gasbag seal.

Still referring to FIG. 1 and additionally to FIGS. 8–12, the propulsion system includes a pair of vertical tubular members 72 and 74 having first ends terminating in lugs 76 and 78 pivotally attached to clevis 80 mounted on the gondola 30 by means of pins 82 at point in front of the center of gravity 47. The tubular members extend through holes 83 in the arms 60 and 66 of the catenary curtains 50 and 52 with the second ends 84 and 86 extending out of the upper surface 26 of the gasbag 12 through bearing assemblies 88 mounted to the upper surface. Referring particularly to FIG. 11 and 12, the propulsion assemblies 44A and 44B include a pylon aerodynamic fairing assembly 90 that incorporate pivot bearings 92A and 92B. Rotation is accomplished by a motor assembly (not shown) mounted within fairing 90. Each bearing assembly 88 includes a hollow tubular member 94 that extends through a hole 96 in the gasbag 12 and in which the tubular members 72 and 74 are slidably mounted. End caps 97A and 97B secured thereto by fasteners 98 form recesses 99 for O-rings seals 100A and 100B. The tubular member 94 includes an external flange 102, which is in contact with the external surface of the gasbag 12 about the hole 96. The immediate area 103 of the gasbag 12 about the hole 96 is reinforced with a plurality of reinforcing plies 104. A flat ring 106 mounted about the tubular member 94 sandwiches the reinforced area 103 between it and the flange 102 and the two are secured together by means of fasteners 108. Thus the thrust of the propulsion units 44A and 44B is transmitted via the tubular members 72 and 74 into the gasbag 12 via the fittings 88.

Referring to FIG. 13, the tubular member 74 is also attached to the catenary curtain 52 by means of an attachment fitting 110. The attachment fitting 110 includes a ridged ring member 112 mounted to the tubular fitting 74. A secondary ring 114 is pivotally attached to ridged ring 112. A plurality of flexible strands 116 are attached at one end to the secondary ring 114 with the cables fanning out along the curtain 52 and attached along their length to the curtains providing additional support for the tubular member 74. The tubular member 72 is attached to catenary curtain 50 in a similar manner. The strands 116 transfer vertical shear loads into the tubular members that are induced into the curtains by the gondola at takeoff.

Figure 15:
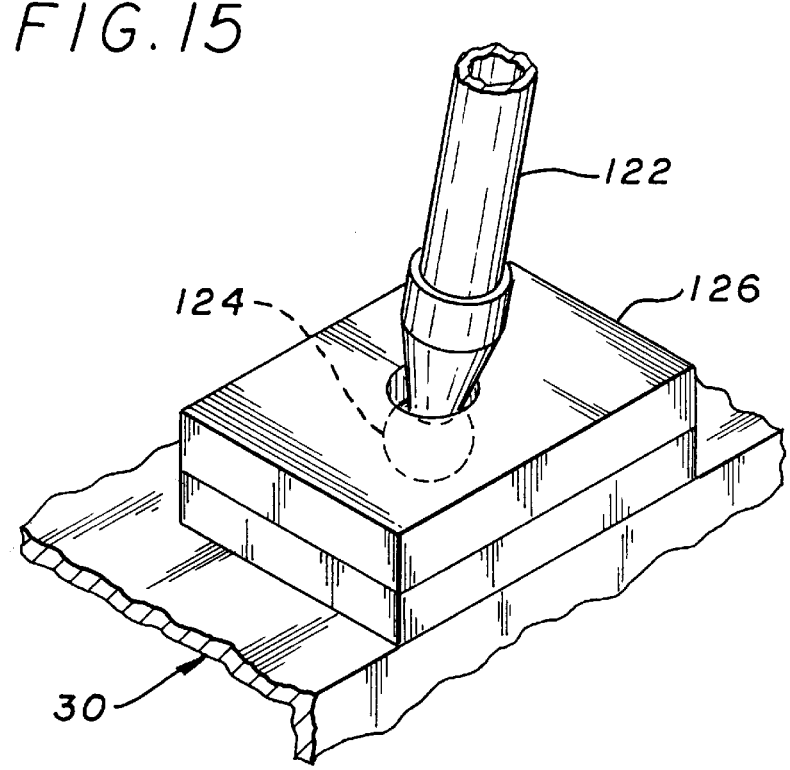
FIG. 15 is an enlarged perspective view of the attachment fitting connecting the rear propulsion system mounting tube to the gondola.
Figure 16:
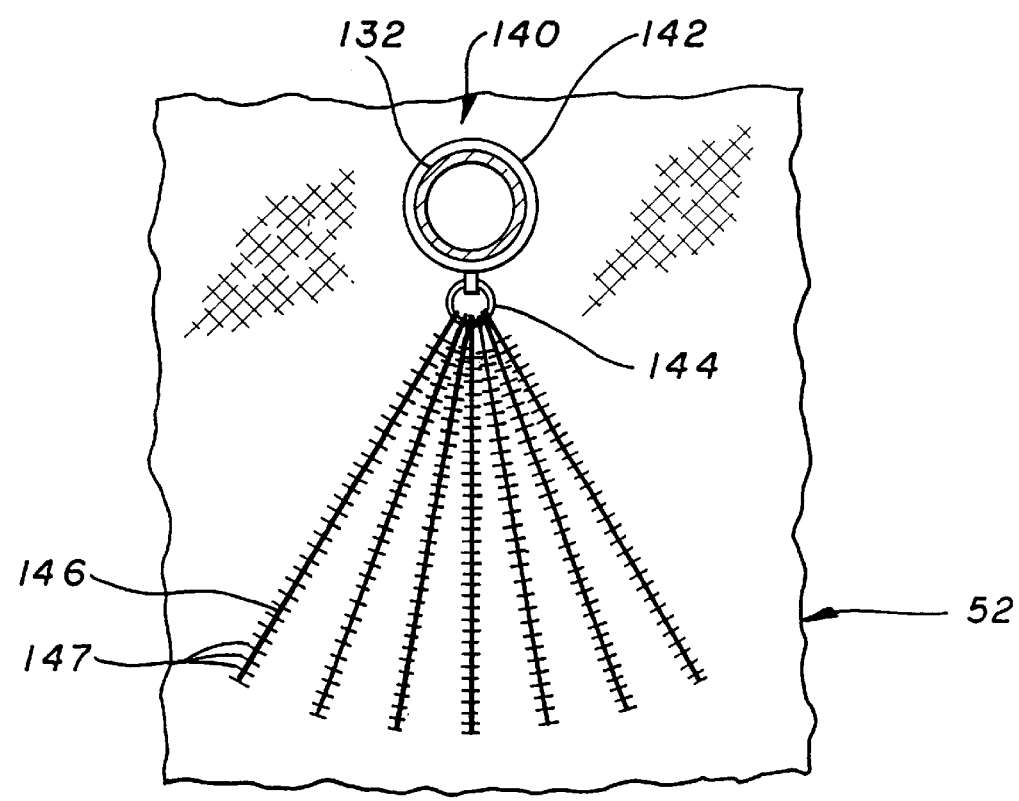
FIG. 16 an enlarged perspective view of the attachment fitting connecting the rear propulsion system mounting tube to the catenary curtain.

Referring to FIGS. 14–16, the propulsion system further includes vertically extending tubular members 120 and 122 having first ends terminating in an attachment ball 124 that is pivotally secured in a socket 126 mounted on the side of the gondola 30 above the main landing gear 38 forming a ball joint (only the tubular member 122 is shown in detail). The opposite ends 128 and 130 are rigidly attached to a horizontal tubular member 132 that extends through holes 133 in the catenary curtains 50 and 52 and out the sides of the gasbag 12. Ends 136 and 138 of the tubular member 132 are coupled to propulsion units 44C and 44D. The Propulsion units 44C and 44D are connected to the ends 136 and 138 of the tubular member 132 in a manner similar to the connection of propulsion units 44A and 44B to tubular members 72 and 74. In addition, the tubular member 132 is sealed to gasbag 12 in a manner similar to tubular members 72 and 74 (by means of fittings 88).

Referring to FIG. 16, the tubular member 132 is also attached to the legs 63 and 67 of the catenary curtains 52 and 54 by means of attachment fittings 140. Each attachment fitting 140 includes a ridged ring member 142 mounted to the tubular fitting 132. A secondary ring 144 is pivotally attached to ridged ring 142. A plurality of flexible strands 146 are attached at one end to the secondary ring 114 with the strands fanning out along the curtains 52 and 54 and are attached along there length to the curtains by means of stitches 147. Again as in the case of attachment fittings 110, attachment fittings 140 transfer vertical shear loads induced into the curtains by the gondola at takeoff into the tubular members 120 and 122

Thus the propulsion system with four rotatable propulsion units in pairs of two, 44A and 44B extending out the top surface 26 of the vehicle 10 and 44C and 44D extending out the side of the vehicle, in a staggered relationship both vertically and horizontally, and being rotatable, provide excellent directional control, particularly when landing.

Figure 17:
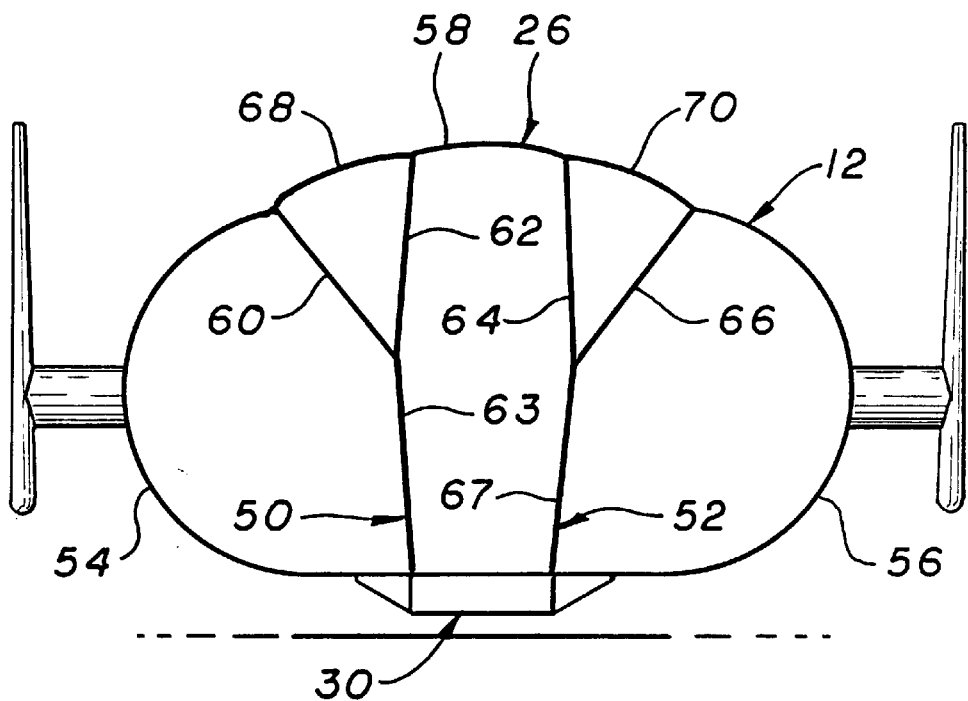
FIG. 17 is cross-sectional view of FIG. 4 taken along the line 17—17.
Figure 18:
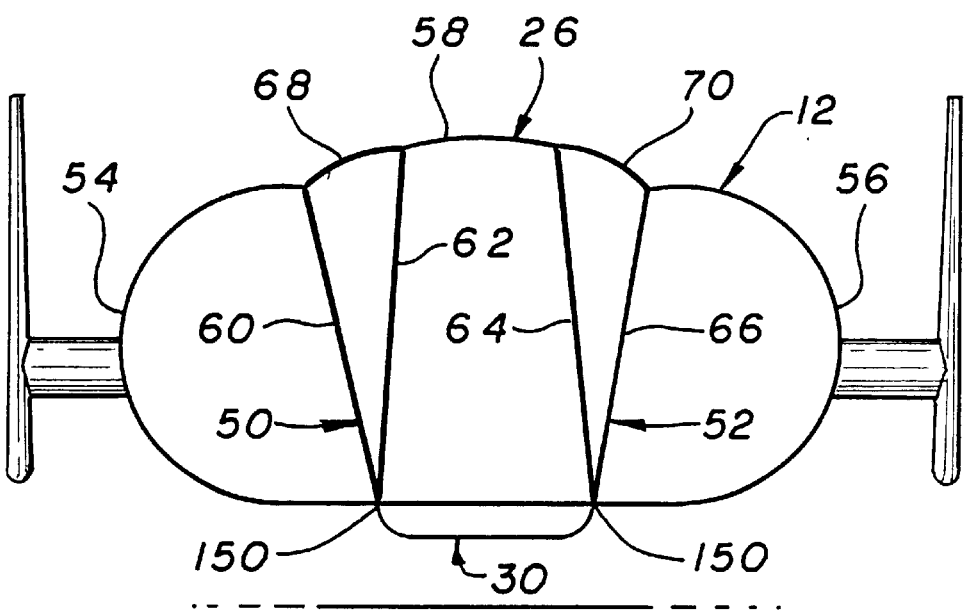
FIG. 18 is cross-sectional view of FIG. 4 taken along the line 18—18.
Figure 19:
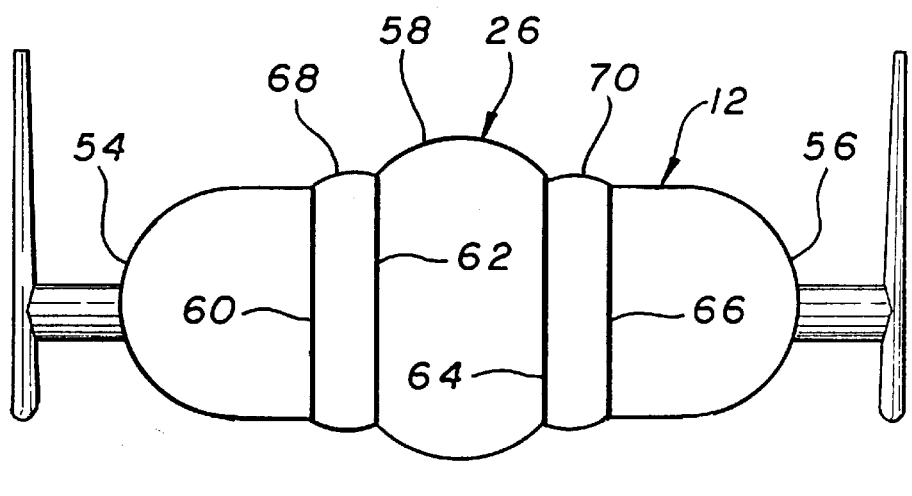
FIG. 19 is cross-sectional view of the vehicle shown in FIG. 4 taken along the line 19—19.
Figure 20:
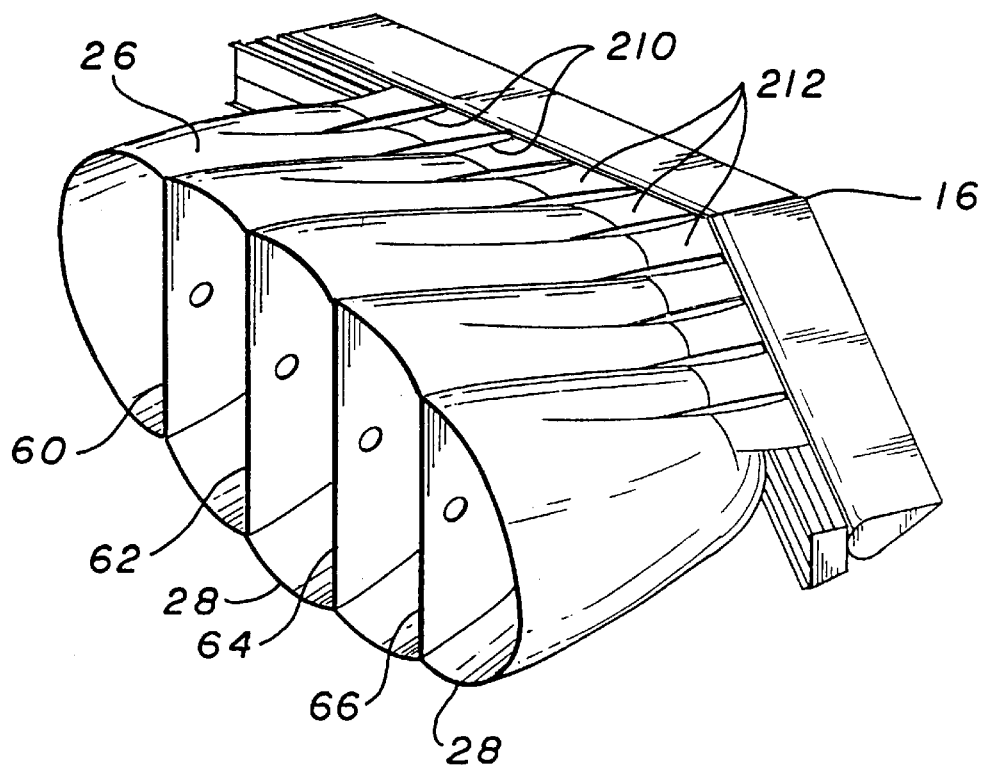
FIG. 20 is a partial perspective view of the vehicle shown in FIG. 4 taken along the line 20—20 in FIG. 4.

Referring now to FIGS. 17–19 as the catenary curtains 50 and 52 continue aft and, beginning at around 50 to 52 percent of length of the gasbag 12 measured from the front end 14, the Y becomes deeper, such that is the arms 60 and 62 of curtain 50 and arms 64 and 66 of the curtain 52 become longer (FIG. 17). Further on toward the rear end 16 as shown in FIG. 18, the arms form a V with the apex 150 at the bottom surface 28 and the legs 63 and 67 disappear. Thereafter, as shown in FIG. 19, the arms 60, 62, 64 and 66 now start to spread apart at the bottom until they become vertical as indicated in FIG. 20. This occurs at about approximately 52 to 54 percent of the distance along the length of the gasbag 12 as measured from the front end 14.

Figure 23:
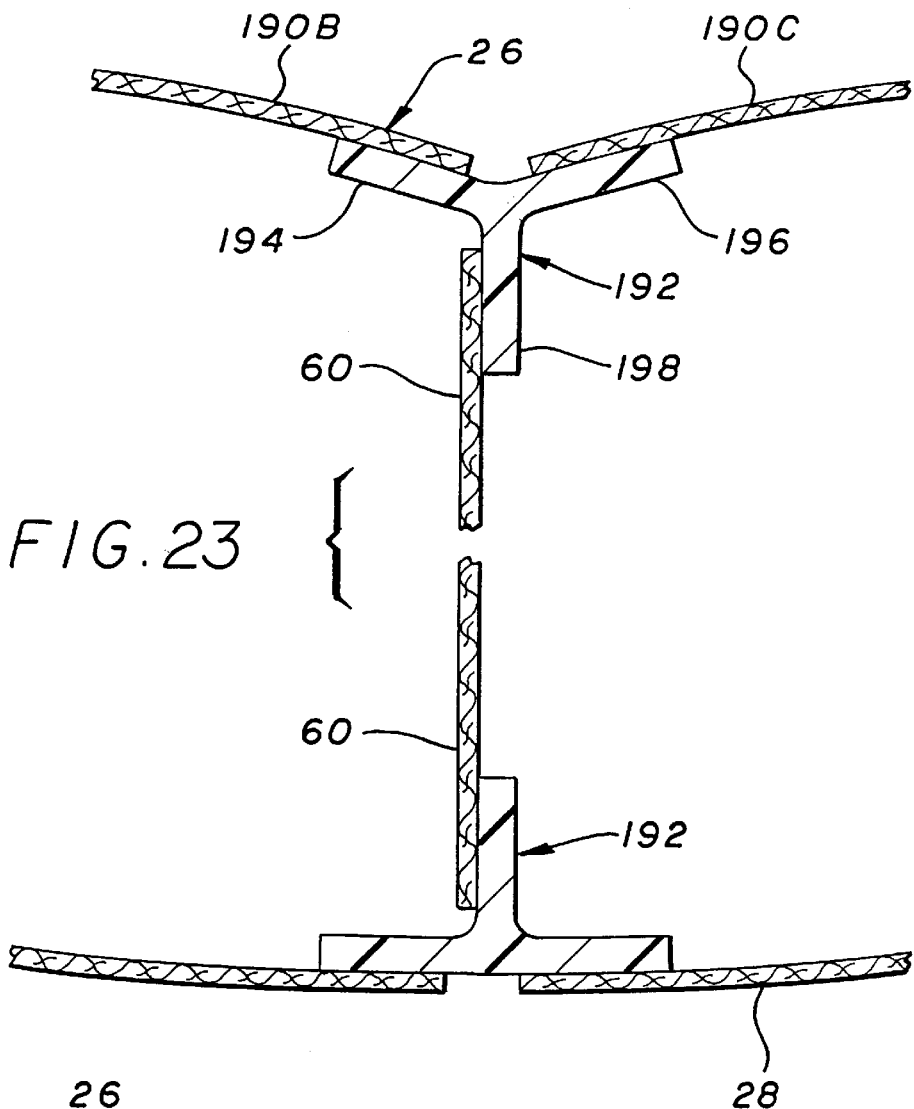
FIG. 23 is a cross-sectional view of the vehicle shown in FIG. 4 taken along the line 23—23.

Further along toward the rear as illustrated in FIGS. 21 and 22, additional secondary vertical curtains 152 and 154, 156 and 158, 160 and 162, 164 and 166 extend out ward toward the tail 16 from either side of the now vertical curtains 60, 62, 64 and 66, respectively, at an acute angle thereto. Curtains 154 and 156, 158 and 160, and 162 and 164 meet and join and form single curtains 170, 172 and 174 between curtains 60, 62 64 and 66 that extend to the rear end of the gasbag 12. Curtains 152 and 166 meet and join with outer most curtains 180 and 182 extending inward from the side of the gasbag 12 to from vertical curtains 184 and 186 that extend to the rear of the gasbag. This transition begins at about approximately 65 to 70 percent of the length of the gasbag 12 measured from the front end 14 (30 to 33 percent measured from the rear of the gasbag). Thus the tail end of the gasbag terminates in 9 vertical curtains creating 10 smaller lobes 190A, 190B, 190C, 190D, 190E, 190F, 190G, 190H, 190I and 190J. Referring to FIG. 23, the typical lobe to curtain joint is accomplished by means of Y shaped transition members 192. As illustrated, lobes 190B and 190C are joined to the arms 194 and 196 of the Y member 192 and the leg 198 to the vertical curtain 60.

Figure 25:
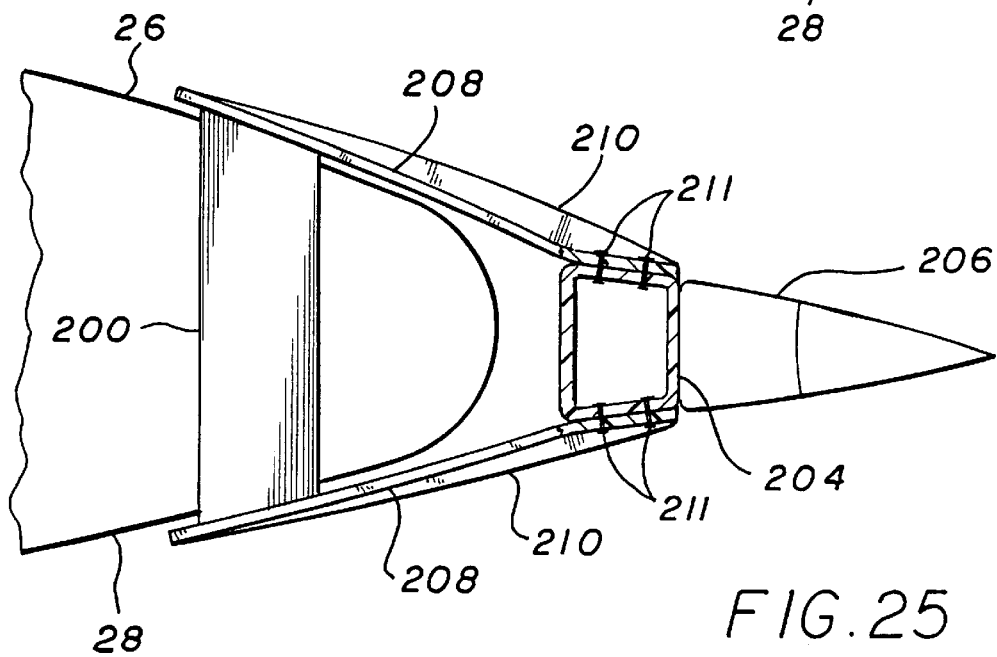
FIG. 25 is a cross-sectional view of a portion of the rear of the vehicle shown in FIG. 4 taken along the line 25—25.
Figure 24:
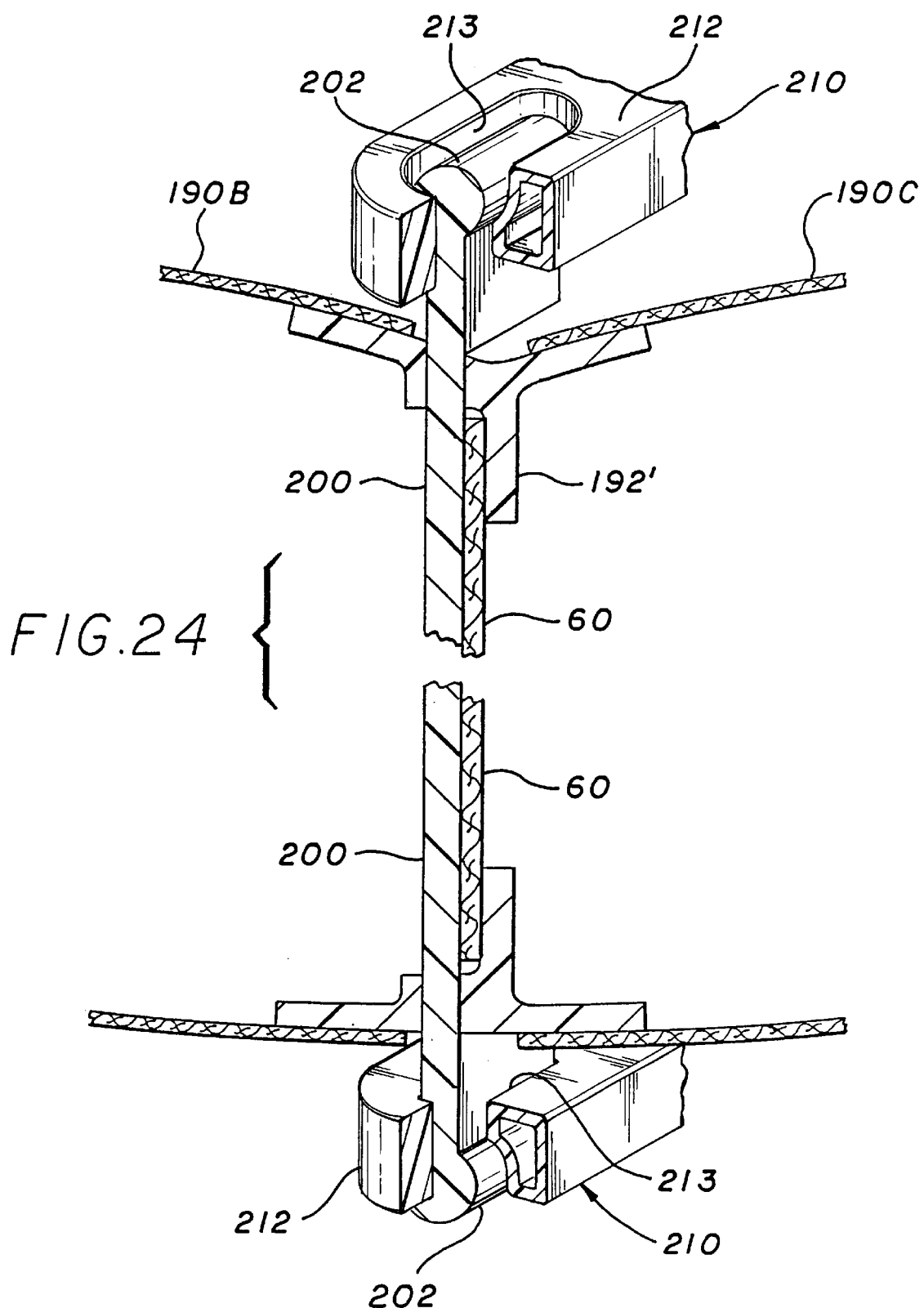
FIG. 24 is a cross-sectional view of a portion of the rear of the vehicle shown in FIG. 4 taken along the line 24—24.

Still referring to FIG. 23 and additionally to FIGS. 24 and 25, in proximity to the rear end of the gasbag 12, a flat flexible strap 200, preferably made of a high modulus composite material, extends along a short portion of each of the vertical curtains 172–186 and is bonded thereto. The strap 200 extends out of the gasbag through the Y shaped members 192' modified to accept the beam. The strap 200 terminates at each end in an elongated bulb like fittings 202.

The tail assembly 46 is forward swept at a shallow angle 203 of around 20 degrees and includes an equally swept support beam 204 with the horizontal and vertical stabilizers 206 and 208 mounted thereto. Attachment fittings 210 are attached at one end to the top and bottom of beam 204 and extend forward on both the top and bottom surfaces 26 and 28 of the gasbag 12 and over the curtains 60–66, and 172–186 and terminate in slotted member 212 having a slot 213 that engage the bulb like fittings 202 of the strap 200. Cloth aerodynamic fairings 214 are attached at one end to the gasbag 12 and at the opposite ends to the beam 204 providing aerodynamic covers reducing drag. The length of the strap 200 and the placement of the attachment fittings are such that the beam 200 is placed in tension. Thus loads from the tail member 46 are distributed into the gag bag 12 along the entire rear end thereof. By use of a large number of vertical curtains at the rear, loads are transferred forward in a uniform fashion. In addition, the forward sweep at the rear end 16 provides for lifting gas to be positioned slightly within the tail assembly envelop providing a lift force in proximity thereto. This has the affect of shifting the center of buoyancy aft and closer to the center of gravity 47. Ideally one would want the center of buoyancy aligned with the center of gravity.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. A non-ridged, semi-buoyant aircraft comprising a pressure stabilized gasbag having front and rear ends and an aerodynamic shape capable of producing lift, and longitudinal, vertical and horizontal axis, said tail end of said gasbag extending outward along said horizontal axis from each side of said longitudinal axis toward said front end at an acute angle to said horizontal axis, a horizontal tail surface mounted outboard of the rear end of said gasbag, said horizontal tail surface having a trailing edge extending outward along said horizontal axis from each side of said longitudinal axis toward said front end at said acute angle to said horizontal axis, said acute angle being approximately 20 degrees, a horizontal ridged beam mounted outboard of the rear end of said gasbag, said horizontal beam extending outward along said horizontal axis from each side of said longitudinal axis toward said front end at said acute angle to said horizontal axis, said horizontal tail surface mounted to said beam, said gasbag having a plurality of vertical catenary curtains attached between said upper and lower surfaces of said gasbag, a vertical extending flexible strap attached to each of said catenary curtains, said straps having top and bottom ends extending out of said top and bottom surfaces, respectively, of said gasbag, top and bottom attachment fittings mounted by a first end to the top and bottom of each ridged beam and by their second ends to said top and bottom ends, respectively, of said flexible straps such that said attachment fittings secure said beam to said gasbag.

2. A non-ridged, semi-buoyant aircraft comprising a pressure stabilized gasbag having front and rear ends and an aerodynamic shape capable of producing lift, and longitudinal, vertical and horizontal axis, said rear end of said gasbag extending outward along said horizontal axis from each side of each longitudinal axis toward said front end at an acute angle to said horizontal axis, said gasbag having a plurality of vertical catenary curtains attached between said upper and lower surfaces of said gasbag in proximity to said rear end thereof, a horizontal tail surface mounted outboard of said rear end of said gasbag, said horizontal tail surface having a trailing edge extending outward along said horizontal axis from each side of said longitudinal axis toward said front end at said acute angle to said horizontal axis, said acute angle being approximately 20 degrees, a horizontal ridged beam mounted outboard of said rear end of said gasbag, said horizontal beam extending outward along said horizontal axis from each side of said longitudinal axis toward said front end at said acute angle to said horizontal axis, said horizontal tail surface mounted to said beam, a vertical extending flexible beam attached to each of the catenary curtains, said straps having top and bottom ends extending out of said top and bottom surfaces, respectively, of said gasbag, top and bottom attachment fittings mounted by first ends to the top and bottom, respectively, of each ridged beam and by their second ends to said top and bottom ends, respectively, of said flexible straps such that said attachment fittings secure said ridged beam to said gasbag.

* * * * *